(12) United States Patent
Tapson

(10) Patent No.: US 7,321,229 B2
(45) Date of Patent: Jan. 22, 2008

(54) INDUCTIVE POSITION SENSORS WITH SECONDARY WINDINGS WITH INCREASED OR DECREASED NUMBER OF TURNS

(75) Inventor: Jonathan Craig Tapson, Cape Town (ZA)

(73) Assignee: University of Cape Town, Cape Town (ZA)

( * ) Notice: Subject to any disclaimer, the term of this patent is extended or adjusted under 35 U.S.C. 154(b) by 88 days.

(21) Appl. No.: 11/358,905

(22) Filed: Feb. 21, 2006

(65) Prior Publication Data

US 2006/0208725 A1   Sep. 21, 2006

Related U.S. Application Data

(63) Continuation of application No. PCT/ZA2004/000101, filed on Aug. 20, 2004.

(60) Provisional application No. 60/496,554, filed on Aug. 20, 2003.

(51) Int. Cl.
*G01B 7/14* (2006.01)

(52) U.S. Cl. .................. 324/207.17; 324/207.24; 336/130; 340/870.36; 318/660

(58) Field of Classification Search ............... 324/207.11–207.25; 341/15; 340/870.36; 318/657, 318/660; 336/130
See application file for complete search history.

(56) References Cited

U.S. PATENT DOCUMENTS

| 4,678,991 A | 7/1987 | Schmidt et al. |
| 4,847,548 A | 7/1989 | Lafler et al. |
| 4,896,110 A * | 1/1990 | Shimizu et al. ........ 324/207.18 |
| 5,453,685 A * | 9/1995 | Gould et al. ........... 324/207.16 |
| 6,489,899 B1 | 12/2002 | Ely et al. |

FOREIGN PATENT DOCUMENTS

| DE | 38 01 779 A1 | 7/1989 |
| WO | WO 97/39312 | 10/1997 |

* cited by examiner

*Primary Examiner*—Jay M Patidar
(74) *Attorney, Agent, or Firm*—Dalina Law Group, P.C.

(57) ABSTRACT

A position sensor comprising a primary winding (26) for generating a magnetic flux, a first secondary winding (24.1) the number of turns of which increases in one direction, a second secondary winding (24.2) the number of turns of which increases in the opposite direction to that of the first secondary winding. Both secondary windings (24.1, 24.2) are subjected to the magnetic flux generated by the primary winding (26) whereby voltages are induced in the secondary windings. The sensor further comprises an element movable with respect to the secondary windings. The element is of a magnetic or conductive material and distorts, in its vicinity, the magnetic flux generated by the primary winding (26). By providing third and fourth secondary windings at right angles to the first and secondary windings it is possible to detect position in two dimensions.

12 Claims, 4 Drawing Sheets

US 7,321,229 B2

INDUCTIVE POSITION SENSORS WITH SECONDARY WINDINGS WITH INCREASED OR DECREASED NUMBER OF TURNS

This application claims priority to and is a continuation of international application PCT/ZA2004/000101 filed 20 Aug. 2004, which claims benefit from and is a Paris Convention filing of U.S. Provisional Patent Application Ser. No. 60/496,554 filed 20 Aug. 2003, the specifications of which are hereby incorporated herein by reference.

BACKGROUND OF THE INVENTION

1. Field of the Invention
This invention relates to position sensors.
2. Description of the Related Art
A linear variable differential transformer (LVDT) is a device which is used for sensing the position of objects in industrial machinery. For example, in machines which produce steel pressings (such as car body panels), there is a requirement to check the dimensions of the pressings after production (a process called gauging). This is done using an array of LVDTs, mounted in a frame, to measure the panel's dimensions and shape. A typical LVDT, see FIG. 1 of the accompanying drawings, consists of a rod 10 (the moving part) and a cylinder 12 (the fixed part).

The end of the rod may have a nut fastening 14 as shown or a contact probe. The cylinder 12 contains a primary transformer winding 16 (see FIG. 2) and two secondary transformer windings 18, 20 which are used to detect the position of a core 22 mounted on the end of the rod 10.

LVDTs have an accuracy of as little as one micron (a thousandth of a millimetre) and can be constructed as large as is necessary. LVDTs which can accommodate displacements of a meter are not uncommon.

Applicant is aware of many patents which disclose position sensors of the LVDT type discussed above. Applicant is also aware of a non-LVDT type of position sensor which has recently been disclosed in U.S. Pat No 6,489,899B1.

The present invention seeks to provide a sensor which is an improvement of the LVDT and non-LVDT types of position sensor discussed above.

BRIEF SUMMARY OF THE INVENTION

According to the present invention there is provided a position sensor comprising a primary winding for generating a magnetic flux, a first secondary winding the number of turns of which increases in one direction, a second secondary winding the number of turns of which increases in the opposite direction to that of the first secondary winding, both secondary windings being subjected to the magnetic flux generated by the primary winding whereby voltages are induced in said secondary windings, and an element movable with respect to the secondary windings, the element being of a magnetic or conductive material and distorting, in its vicinity, said magnetic flux generated by the primary winding.

Each secondary winding can comprise a plurality of side-by-side sections, each intermediate section having more turns than the section to one side thereof and less turns than the section on the other side thereof, one end section having less turns than the intermediate section next to it and the other end section having more turns than the intermediate section next to it.

Portions of the secondary windings transverse to said directions can be skew to said directions.

The outputs from the secondary windings are preferably connected to a circuit comprising a differential amplifier and a demodulator to provide a d.c. output. For best results, the difference in the signals from each winding should be divided by the sum of the signals, to provide a so-called ratiometric output. This technique reduces the effect of common-mode changes in the magnetic circuit, and is well understood in the art.

To enable position to be sensed in two dimensions, the present invention provides a position sensor comprising a primary winding for generating a magnetic flux, a first secondary winding the number of turns of which increases in one direction, a second secondary winding the number of turns of which increases in the opposite direction to that of the first secondary winding, both secondary windings being subjected to the magnetic flux generated by the primary winding whereby voltages are induced in said secondary windings, a third secondary winding the number of turns of which increases in a direction transverse to said one direction, a fourth secondary winding the number of turns of which increases in the opposite direction to that of the third secondary winding, the third and fourth secondary windings being subjected to the magnetic flux generated by the primary winding whereby voltages are induced in said secondary windings, and an element movable with respect to the secondary windings, the element being of a magnetic or conductive material and distorting, in its vicinity, said magnetic flux generated by the primary winding.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION

Figure 1:
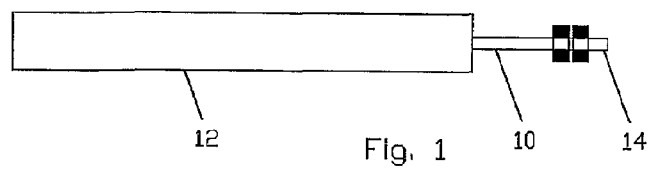
FIG. 1 shows a typical LVDT.
Figure 2:
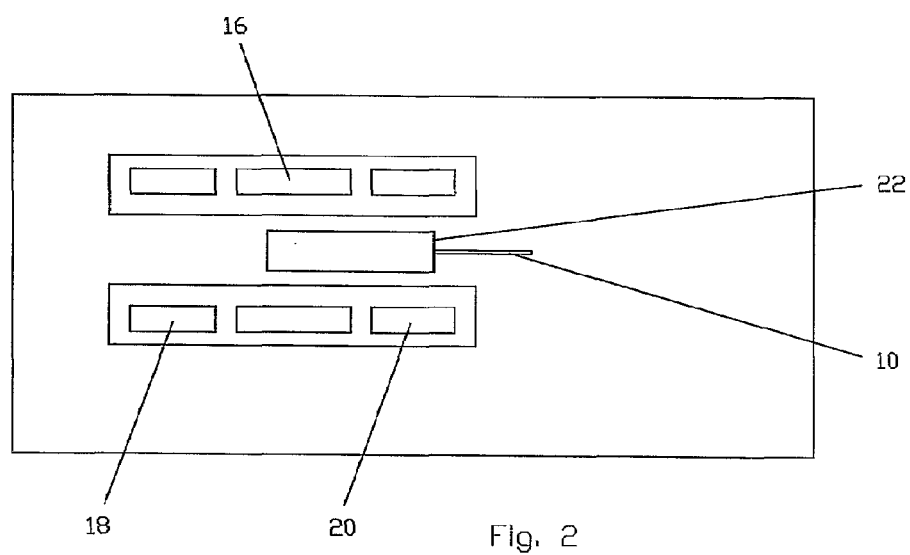
FIG. 2 shows primary transformer winding of cylinder 12 in FIG. 1.
Figure 3:
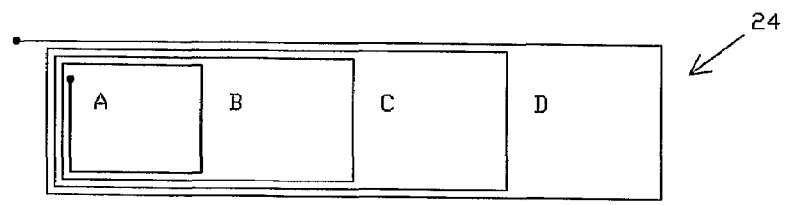
FIG. 3 is a plan view of a transformer winding.

Referring to FIG. 3, the transformer winding 24 illustrated is on a planar substrate and comprises four transformer sections designated A, B, C and D. Each section is in the form of a winding of rectangular configuration. Section A is illustrated as having four turns, section B as having three turns, section C as having two turns and section D as having one turn. In practice, of course, there will be many more turns but the pattern of a decreasing number of turns from section to section is maintained.

Magnetic flux lines perpendicular to the plane of the drawings and passing through section A, B, C and D induce current flow in the winding 24. By the laws of magnetic induction, the current generated in each section is dependant on the number of turns. Hence, in the illustrated embodiment, flux passing through section A will generate four times as much current as the same flux passing through Section D.

A transformer wound so that the number of turns varies from one end to the other is hereinafter referred to as having a "tapered winding".

A tapered winding can be created using the techniques employed to produce printed circuit boards.

Figure 4:
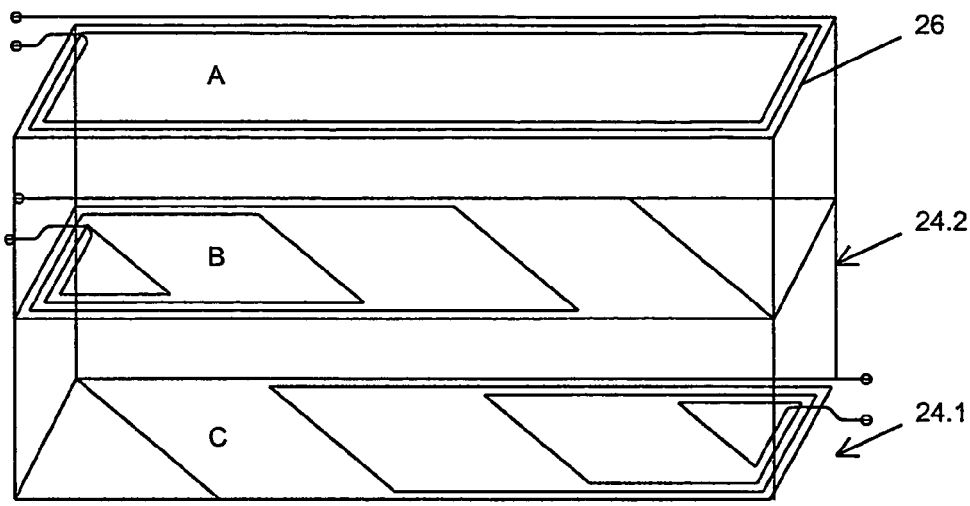
FIG. 4 is an "exploded" view of the windings of a position sensor which senses position in one dimension.

Turning now to FIG. 4, the position sensor illustrated comprises two windings 24.1, 24.2 each of the form shown in FIG. 3. The number of turns of the winding 24.1 increases in the longitudinal direction, that is, from left to right and the number of turns of the winding 24.2 increases from right to left in the longitudinal direction. The windings thus taper in opposite directions to one another. The transverse lengths of the windings are shown as being skew to the longitudinal direction thereby to provide a smooth transition from section to section rather than a step-like transition.

A rectangular primary winding is shown at 26. The winding 26 generates a magnetic flux to which the windings 24.1 and 24.2 are subjected, thereby generating an alternating current in each winding 24.1, 24.2.

Figure 5:
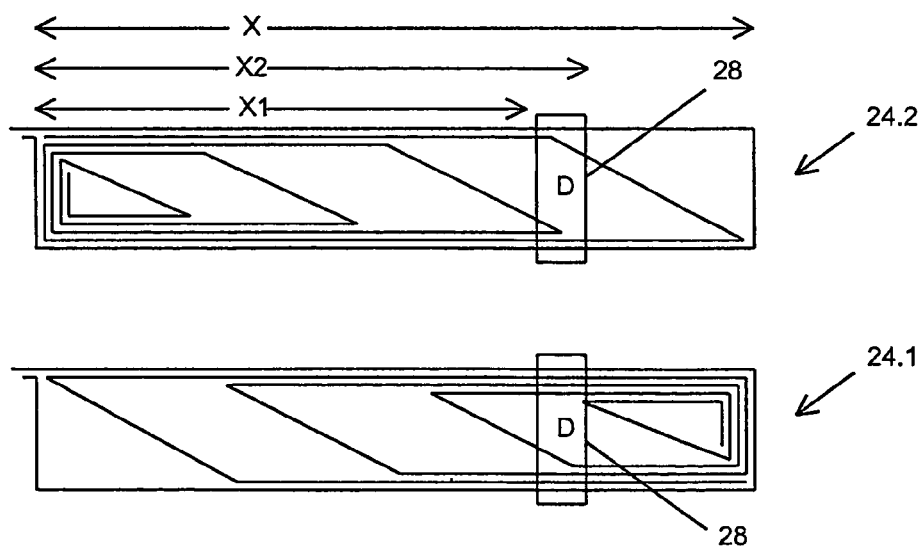
FIG. 5 is a pictorial view of a conductive or magnetic element in conjunction with two secondary windings which are shown spaced apart.

In FIG. 5 the windings 24.1 and 24.2 are illustrated as well as an element 28 which moves back and forth from left to right and the position of which is to be sensed. The element 28 can be electrically conductive or can have a different magnetic permeability to the medium, usually air, which surrounds it. Dimensions X, X1 and X2 are designated in FIG. 5 for the purposes of the following explanation.

The following is a simple analysis of a one-dimensional position sensor in accordance with the present invention. Ignoring the effect of the short end sections, the transformer windings are modelled as two sets of parallel, co-located conductors placed a distance Z apart. The length of the longest conductor is X, and all of the m conductors of the primary winding 26 are the full length X. The conductors of one secondary winding 24.1 run from x=0 to iX/n, where i is the endpoint of the ith of n conductors. The conductors of the other secondary winding 24.2 run from x=(n-i)X/n to X. A circulating current Ip running through each conductor of the primary induces currents in the secondaries S1 and S2 whose magnitudes are:

$$I_{S1} = \frac{I_P m A}{X}\left(\frac{X}{n} + \frac{2X}{n} + \cdots + \frac{(n-1)X}{n} + X\right) \quad (1)$$

and $$I_{S1} = \frac{I_P m A}{X}\left(\frac{X}{n} + \frac{2X}{n} + \cdots + \frac{(n-1)X}{n} + X\right) \quad (1)$$

where A is a coupling factor representing the driving frequency and magnetic coupling (mutual inductance) between the primary and the secondaries. Both these currents are equal. If the number of secondary windings, n, is large, the summation can be approximated by an integral expression, as will be seen in Equations 3 and 4.

If the coupling factor between the primary winding and the secondary windings changes because the local permeability changes, usually from that of air to that of a conductive or magnetic medium, it is possible to model the non-uniformity of the permeability as occurring in a slice which is perpendicular to the transformer plane. The permeabilities could be Ao for air and A1 for the non uniform element. Ao could be in the range 0<x<x1 and x2<x<X, and A1 in the interval x1<x<x2. In this circumstances, the current induced in the secondary windings is, using an integral representation as follows:

$$I_{S1} = I_P \frac{mn}{X^2}\left(A_0\int_0^{x_1} x dx + A_1\int_{x_1}^{x_2} x dx + A_0\int_{x_2}^{X} x dx\right) \quad (3)$$

and $$I_{S2} = I_P \frac{mn}{X^2}\left(A_0\int_0^{x_1}(X-x)dx + A_1\int_{x_1}^{x_2}(X-x)dx + A_0\int_{x_2}^{X}(X-x)dx\right) \quad (4)$$

It is then possible to evaluate the difference between the currents and this reduces to a product of several components:

$$I_{S2} - I_{S1} = \frac{I_P m n}{X^2}(A_0 - A_1)(x_2 - x_1)(X - x_1 - x_2) \quad (5)$$

The first bracketed component of this product represents the difference in coupling caused by the difference in permeability, the second bracketed component represents the size of the area of differing permeability, and the third bracketed component represents the location on the x axis of the area of differing permeability. The current difference is thus linear with respect to the position of the zone of differing permeability.

Figure 6:
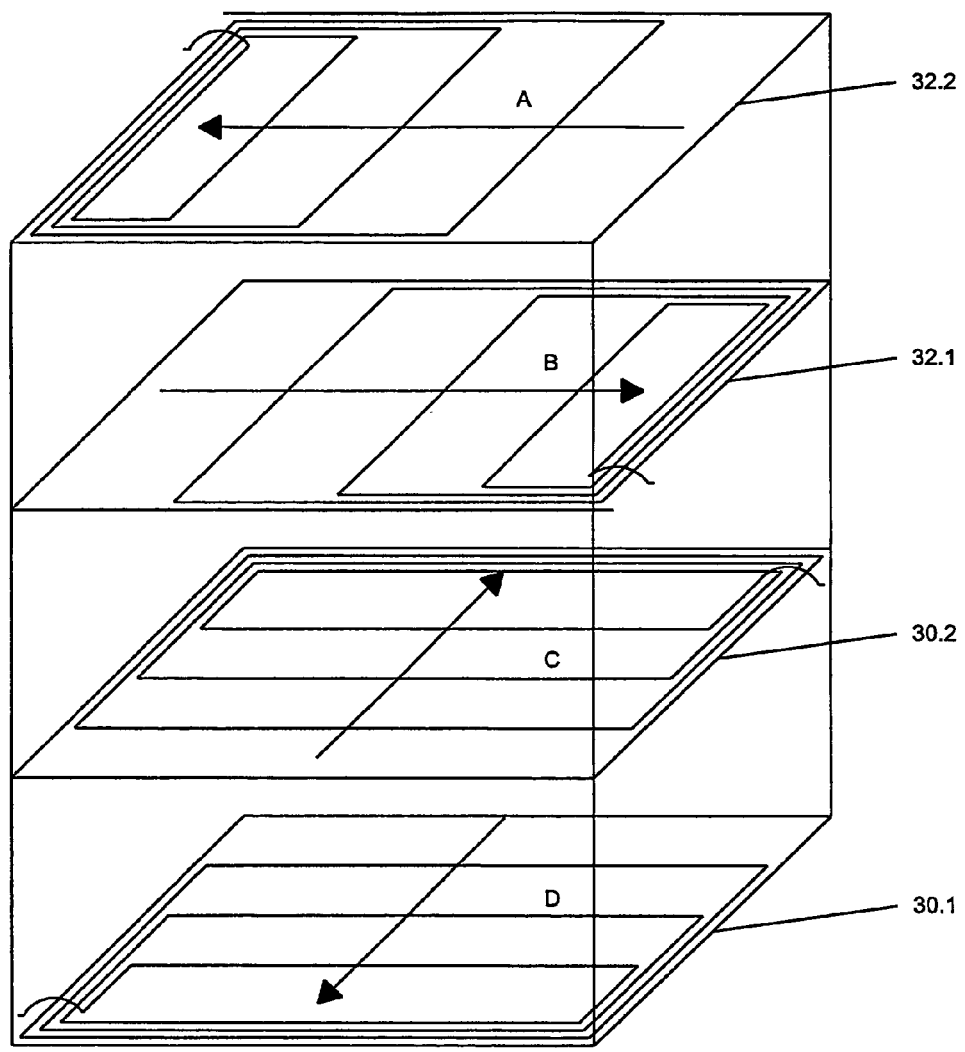
FIG. 6 illustrates a position sensor which senses position in two dimensions.

To enable position to be sensed in two dimensions at right angles to one another, the arrangement shown in FIG. 6 is used.

Four tapering windings 30.1, 30.2 and 32.1, 32.2 are used in conjunction with a single primary winding (not shown). The windings 30.1 and 30.2 taper in opposite directions but in the same dimension. Windings 32.1, 32.2 also taper in opposite directions to one another but in a dimension at right angles to the dimension in which windings 30.1, 30.2 taper.

The primary winding extends around the periphery of the stack of windings 30.1, 30.2, 32.1, 32.2 and is rectangular, for example, square.

The primary winding generates a reasonably uniform magnetic flux density perpendicular to the plane of the secondary windings, and passing through the secondary windings. An element which creates a local nonuniformity in the magnetic field affects the flux passing through a varying number of secondary turns, depending on where the element is positioned. The differential nature of the windings means that the difference in current (induced in each winding of the pair) indicates how far from the centre point of the array of windings the element is located.

The equations discussed above apply to each pair of windings 30.1, 30.2 and 32.1, 32.2 and hence the position of the element in two dimensions can be sensed.

Figure 7:
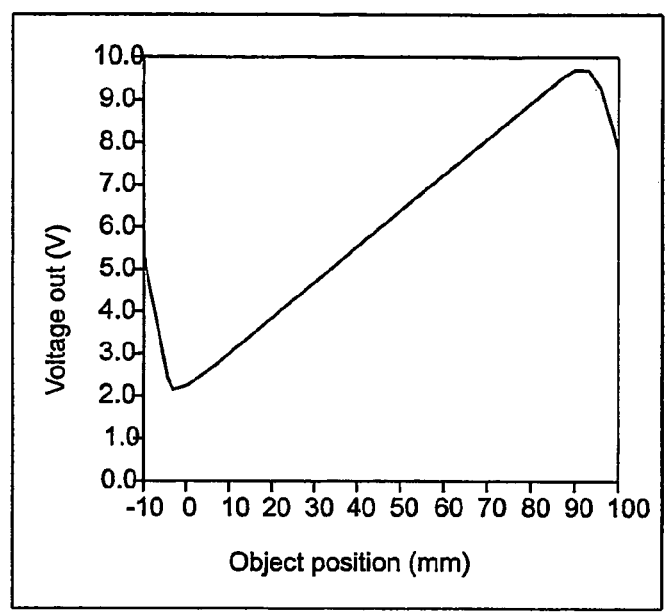
FIG. 7 illustrates the output signal of a position sensor which operates in one dimension.

FIG. 7 is a graph illustrating the output of a position sensor comprising two primary windings tapering in opposite directions. For illustrative purposes the sensor is assumed to have a sensing range of 90 mm. The output is substantially linear in the measuring range. Non-linearity can result from misalignment of the primary and secondary windings.

Figure 8:
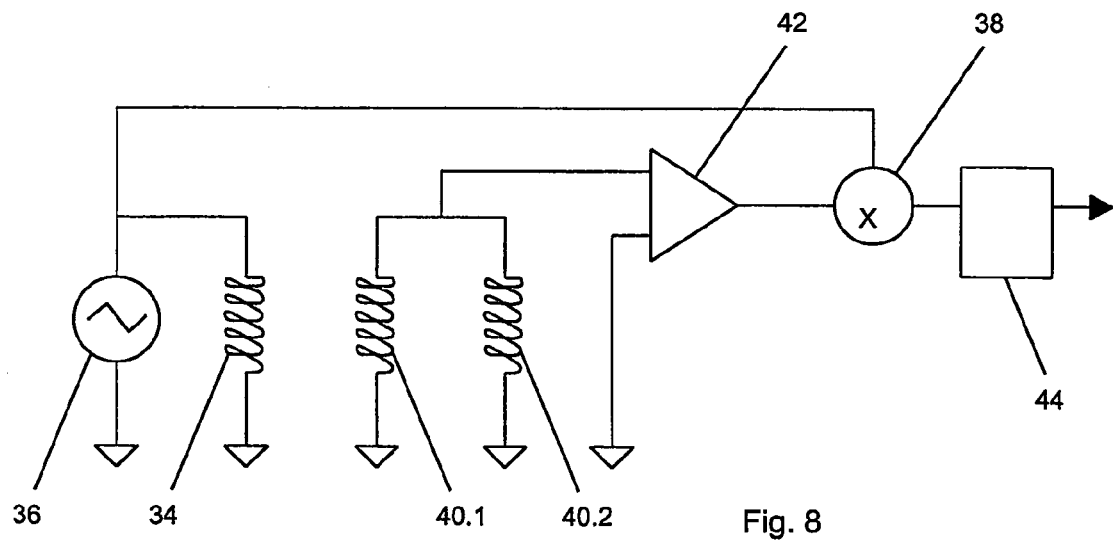
FIG. 8 is a circuit diagram.

Turning finally to FIG. 8, this illustrates a circuit for rectifying the output signals of the secondary windings and providing a demodulated d.c. output signal.

The primary winding 34 is driven by an oscillator 36 which is also connected to a demodulator 38. The secondary windings 40.1, 40.2 are connected to a differential amplifier 42 and the output of the amplifier 42 constitutes the input to the demodulator 38. The output of the demodulator 38 is fed to a low pass filter 44, the output of the filter 44 being the d.c. signal illustrated in FIG. 7.

The pattern of the windings can be varied to give particular effects that are required. For example, if there is a greater need for accuracy in a specific area, the windings can be such as to be more sensitive in that area.

To improve sensitivity, it is possible to provide a position sensor on each side of the element 28. This construction is particularly suitable when the element 28 is relatively large. An example is that the position of a drive shaft can be detected by position sensors located on each side thereof.

What is claimed is:

1. A position sensor comprising:
   a primary winding configured to generate a magnetic flux;
   a first secondary winding comprising a number of turns which increases in one direction;
   a second secondary winding comprising a number of turns which increases in an opposite direction to that of said first secondary winding;
   said first secondary winding and said second secondary winding being subjected to a magnetic flux generated by said primary winding wherein voltages are induced in said first secondary winding and said second secondary winding; and,
   an element movable with respect to said first secondary winding and said second secondary winding, wherein said element comprises a magnetic or conductive material and distorting, in its vicinity, said magnetic flux generated by said primary winding.

2. The position sensor of claim 1 wherein said first secondary winding and said second secondary winding comprises a plurality of side-by-side sections, each intermediate section having more turns than a section to one side thereof and less turns than a section on another side thereof, one end section having less turns than an intermediate section next to said one end section and an other end section having more turns than said intermediate section next to said other end section.

3. The position sensor of claim 2 wherein those portions of said first secondary winding and said second secondary winding which are transverse to said one direction and said opposite direction are skew to said one direction and said opposite direction.

4. The position sensor of claim 3, wherein outputs from said first secondary winding and said second secondary winding are connected to a circuit comprising a differential amplifier and a demodulator configured to provide a direct current output.

5. The position sensor of claim 2, wherein outputs from said first secondary winding and said second secondary winding are connected to a circuit comprising a differential amplifier and a demodulator configured to provide a direct current output.

6. The position sensor of claim 1, wherein outputs from said first secondary winding and said second secondary winding are connected to a circuit comprising a differential amplifier and a demodulator configured to provide a direct current output.

7. A position sensor comprising:
   a primary winding configured to generate a magnetic flux;
   a first secondary winding comprising a number of turns which increases in one direction;
   a second secondary winding comprising a number of turns of which increases in the opposite direction to that of said first secondary winding;
   said first secondary winding and said second secondary winding being subjected to magnetic flux generated by said primary winding wherein voltages are induced in said first secondary winding and said second secondary winding;
   a third secondary winding comprising a number of turns of which increases in a direction transverse to said one direction;
   a fourth secondary winding comprising a number of turns of which increases in the opposite direction to that of said third secondary winding;
   said third secondary winding and said fourth secondary winding being subjected to the magnetic flux generated by said primary winding wherein voltages are induced in said first secondary winding and said second secondary winding; and,
   an element movable with respect to said first secondary winding and said second secondary winding, wherein said element comprises a magnetic or conductive material and distorting, in its vicinity, said magnetic flux generated by said primary winding.

8. The position sensor of claim 7, wherein said first, second, third and fourth secondary winding comprises a plurality of side-by-side sections, each intermediate section having more turns than a section to one side thereof and less turns than a section on the other side thereof, one end section having less turns than an intermediate section next to said one end section and an other end section having more turns than an intermediate section next to said other end section.

9. The position sensor of claim 8, wherein those portions of said first, second, third and fourth secondary windings which are transverse to said one direction and said opposite direction are skew to said one direction and said opposite direction.

10. The position sensor of claim 9, wherein outputs from said first, second, third and fourth secondary winding are connected to a circuit comprising a differential amplifier and a demodulator thereby to provide a direct current output.

11. The position sensor claim 8, wherein outputs from said first, second, third and fourth secondary windings are connected to a circuit comprising a differential amplifier and a demodulator configured to provide a direct current output.

12. The position sensor of claim 7, wherein outputs from said first, second, third and fourth secondary winding are connected to a circuit comprising a differential amplifier and a demodulator configured to provide a direct current output.

* * * * *